United States Patent

[11] 3,622,749

| [72] | Inventors | Shigeo Kuwayama;<br>Syozo Takeuchi, both of Kanagawa, Japan |
|---|---|---|
| [21] | Appl. No. | 12,312 |
| [22] | Filed | Feb. 18, 1970 |
| [45] | Patented | Nov. 23, 1971 |
| [73] | Assignee | Fuji Photo Film Co., Ltd.<br>Ashigara-Kamigun, Kanagawa, Japan |
| [32] | Priority | Feb. 26, 1969 |
| [33] | | Japan |
| [31] | | 17116 |

[54] CONDUCTION HEATER
3 Claims, 3 Drawing Figs.

[52] U.S. Cl.................................................... 219/354,
219/538
[51] Int. Cl...................................................... H05b 1/00

[50] Field of Search.......................................... 219/353–355,
465, 534, 538, 540, 544, 546, 548,
552–553; 338/226, 232, 296, 306, 310, 321

[56] References Cited
UNITED STATES PATENTS

| 1,076,858 | 10/1913 | Andrews ...................... | 219/548 |
| 1,548,305 | 8/1925 | Dalton.......................... | 338/232 |
| 1,986,636 | 1/1935 | Holinger....................... | 219/546 X |

Primary Examiner—C. L. Albritton
Attorney—Sughrue, Rothwell, Mion, Zinn and Macpeak ABSTRACT: A heater consists of a number of glass tubes arranged in parallel and in contact with one another. Some of the glass tubes have a metallic rod or tube therein and are interposed among other glass tubes carrying a heating strip therein.

PATENTED NOV 23 1971          3,622,749

INVENTORS
SHIGEO KUWAYAMA
SYOZO TAKEUCHI

BY Sughrue, Rothwell, Mion, Zinn and Macpeak

ATTORNEYS

CONDUCTION HEATER

BACKGROUND OF THE INVENTION

1. Field of the Invention

This invention relates to a conduction heater, and in particular to a conduction heater with small temperature variation.

2. Description of the Prior Art

Conventional conduction heating devices employ a striplike heating member (hereinafter called "heating strip") and generally a heater of this type has a heating strip wound on a mica plate of heat-resisting and electric-insulating material, in spiral form and the mica plate with the heating strip thereon, is further sandwiched by a pair of mica plates. Such type of heater has been used as a heating element for irons and the like. Recently, it has become possible to produce a heat-resisting glass of low cost such as a crystallized glass of good infrared ray transmitivity. As an application of the heat-resisting glass of such a type, various kinds of heaters or warmers have been devised utilizing thin glass tubes arranged in parallel and in contact with one another and having a heating strip extending therethrough.

In order to keep the temperature at a fixed level in such a conduction heater, it is conventional to mount a temperature controlling device which cuts on or off the current to the heating strip in response to variation in temperature of the heater. For instance, a bimetal can be used for this purpose. However, since the heat capacity of the conduction heater as described above is small, the temperature cannot be controlled precisely to the fixed level, if the sensing portion of the temperature-controlling device has large heat capacity. And since the temperature varies abruptly, it often overheats or becomes too cool. In order to reduce those disadvantages and obtain optimum heating, sometimes empty glass tubes are interposed among the glass tubes carrying the heating strip.

SUMMARY OF THE INVENTION

In accordance with the present invention, conduction heater consists of a number of glass tubes arranged in parallel and in contact with one another with some of the glass tubes including an iron member of relatively high-heat capacity.

The object of the present invention is to provide a conduction heater which provides adequate control the temperature thereof.

DESCRIPTION OF THE PREFERRED EMBODIMENT

Figure 1:
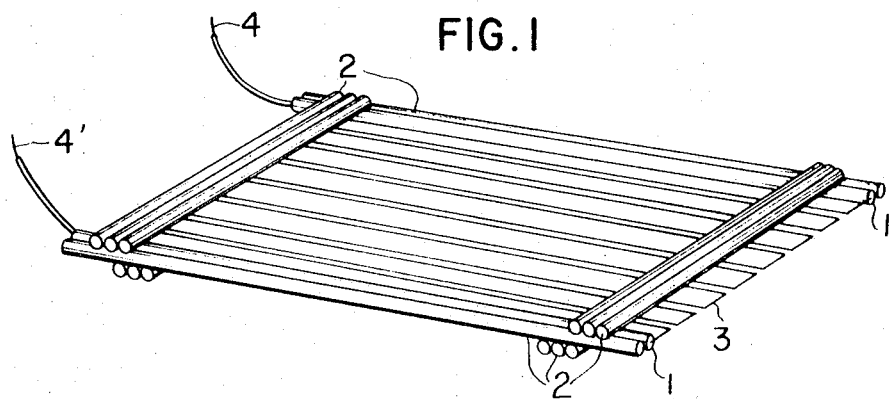
FIG. 1 is a perspective view of a heater in accordance with the present invention.
Figure 2:
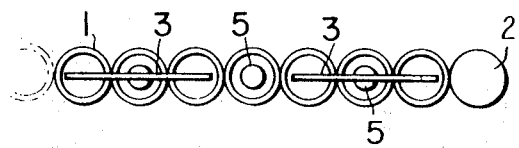
FIG. 2 is an enlarged view of the side face of the heater shown in FIG. 1.
Figure 3:
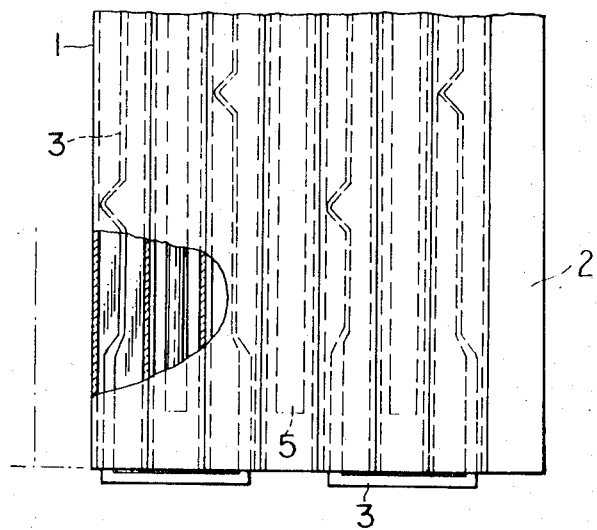
FIG. 3 is an enlarged plan view of a portion of the heater shown in FIG. 1, partly in section.

Now referring to the drawings illustrating an embodiment of the conduction heater in accordance with the present invention, the heater is plate-shaped consisting of a number of glass tubes 1 arranged in parallel and in contact with one another. The tubes 1 are made of crystallized glass and have for instance a diameter of 4 mm., thickness of 1 mm. and length of 300 mm. The arranged tubes 1 are supported or maintained in a plane shape by reinforcing glass rods 2 made of crystallized glass. The reinforcing glass rods 2 are fixed to the glass tubes 1 with heat-resisting cement. The reference numeral 3 indicates the heating strip arranged alternately among the glass tubes 1. The heating strip 3 has bent portions at intervals and is inserted into the arranged glass tubes in series and the plane surface or the larger surface thereof faces the adjacent glass tubes. The strip 3 is connected to an electric source (not shown) through lead wire 4, 4'. A metallic rod or tube 5 is inserted into those glass tubes through which the heating strip 3 is not inserted. The metallic rods 5 inserted in the empty glass tubes are insulated from one another. A bimetal (not shown) detects the surface temperature of the heater and controls the temperature by cutting on and off the electric source.

In the heater constructed as described above, when the heating strip 3 generates heat, the heat is emitted from the glass tubes 1. And at the same time, the metallic rods 5 in the adjacent tubes are also heated. Therefore, the heat capacity of the conduction heater itself is increased. Accordingly, the variation in temperature of the heater as a whole made by the operation of the bimetal is not so abrupt, and even if the heat capacity of the bimetal is rather large the variation of the temperature of the heater as a whole is not so large. Thus, a slow variation in temperature is obtained within the heater itself.

In the embodiment described above, since the larger surface of the heating strip inserted in the glass tube faces the adjacent tube, the radiation heat from the heating strip 3 is not directly emitted outside but irradiated toward the metallic rod 5 in the adjacent tube. Therefore, the radiation heat received by the metallic rods 5 is the main heat emitted from the heater. Accordingly, the rate of the heat of the heating strip in the total heat emitted from the heater is small, and the variation in temperature of the heating strip will not largely influence the variation in temperature of the heater itself as a whole.

Nevertheless, it is of course permissable to arrange the strip in the glass so that the larger face thereof will face perpendicular to the plane of the plate-shaped heater, if the variation range of the temperature of the heater is limited to a desired range. The bent portions of the heating strip 3 are provided in order to use the heat of the heating strip 3 efficiently. If the strip 3 is in contact with the glass tube wall over a wide area, the heat of the heating strip 3 is largely conducted to the glass itself and sufficient amount of heat from the heater itself is not radiated outside.

In accordance with the present invention, a heater of high efficiency may be obtained. Moreover, a heater which has small variation in temperature about the desired temperature can be obtained. Besides, since the metallic rods 5 are inserted into the empty glass tubes, the metallic rods are protected from impurities carried by the heating strip and from the ambient gas which causes chemical action with the rod's surface. The heater in accordance with the present invention makes a fine heating face not only when heated but cooled. The shape of the heater is of course not limited to the plane shape as described in the preferred embodiment.

What is claimed is:

1. In a conduction heater consisting of a linear array of heat-resisting glass tubes carrying an inserted heating strip therein, the improvement which comprises: additional glass tubes each carrying a heat-retaining nonelectrically energizable metallic member therein, said additional glass tubes arranged among said glass tubes carrying said heating strip with said heat-retaining metallic members being electrically insulated from said heating strip.

2. The conduction heater as defined in claim 1 wherein said glass tubes are all arranged in parallel and in contact with one another in side-by-side relation to form an overall plate shape.

3. The conduction heater as defined in claim 2, wherein said heating strip constitutes a thin elongated band, said band being rectangular in cross section with large opposed surfaces joined by thin edges so disposed that the large band surfaces thereof face adjacent tube.

* * * * *